United States Patent
Park et al.

(10) Patent No.: US 11,700,600 B2
(45) Date of Patent: Jul. 11, 2023

(54) INDICATION OF SYNCHRONIZATION SIGNAL BLOCK PROPERTIES OF SINGLE FREQUENCY NETWORKS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Tianyang Bai, Somerville, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/222,661

(22) Filed: Apr. 5, 2021

(65) Prior Publication Data

US 2021/0321381 A1 Oct. 14, 2021

Related U.S. Application Data

(60) Provisional application No. 63/007,050, filed on Apr. 8, 2020.

(51) Int. Cl.
*H04W 72/04* (2023.01)
*H04W 72/044* (2023.01)
(Continued)

(52) U.S. Cl.
CPC ......... *H04W 72/046* (2013.01); *H04W 16/28* (2013.01); *H04W 72/23* (2023.01)

(58) Field of Classification Search
CPC . H04W 72/046; H04W 16/28; H04W 72/042; H04W 52/46; H04W 8/08;
(Continued)

(56) References Cited

U.S. PATENT DOCUMENTS

2018/0249394 A1* 8/2018 Nilsson ............... H04W 52/46
2019/0306828 A1* 10/2019 Kim .................... H04W 8/08
(Continued)

FOREIGN PATENT DOCUMENTS

EP 3681213 A1 7/2020
WO WO-2019056210 A1 3/2019

OTHER PUBLICATIONS

CMCC: "General Discussion on RRM for NR Support of High Speed Scenario", 3GPP Draft, 3GPP TSG-RAN WG4 Meeting #93, R4-1913868, 3rd Generation Partnership Project (3GPP), Mobile Competence Centre, 650, Route Des Lucioles, F-06921 Sophia-Antipolis Cedex, France, vol. RAN WG4, No. Reno, USA, Nov. 18, 2019-Nov. 22, 2019, Nov. 8, 2019 (Nov. 8, 2019), XP051818355, 6 Pages, Retrieved from the Internet: URL: https://ftp.3gpp.org/tsg_ran/WG4_Radio/TSGR4_93/Docs/R4-1913868.zip. R4-1913868, NR HST-RRM General.doc [Retrieved-on Nov. 8, 2019] Section 2.1 figures 3.4.

(Continued)

*Primary Examiner* — Kiet Tang
(74) *Attorney, Agent, or Firm* — Harrity & Harrity, LLP

(57) ABSTRACT

Various aspects of the present disclosure generally relate to wireless communication. In some aspects, a user equipment (UE) may receive synchronization signal block (SSB) information that indicates, for each respective SSB of one or more SSBs, a quantity of how many beams are associated with the respective SSB. The UE may monitor SSBs, determine one or more beams that provide an SSB based at least in part on the SSB information, and direct one or more reception beams toward the one or more beams. Numerous other aspects are provided.

28 Claims, 12 Drawing Sheets

(51) Int. Cl.
*H04W 16/28* (2009.01)
*H04W 72/23* (2023.01)

(58) Field of Classification Search
CPC ... H04L 25/0226; H04B 7/024; H04B 7/0695; H04B 7/088; H04B 7/0617
See application file for complete search history.

(56) References Cited

U.S. PATENT DOCUMENTS

| | | | |
|---|---|---|---|
| 2020/0068463 A1* | 2/2020 | Da Silva | H04B 7/063 |
| 2020/0084703 A1* | 3/2020 | Rune | H04W 72/1263 |
| 2020/0153498 A1* | 5/2020 | Kotecha | H04B 7/0695 |
| 2020/0305099 A1* | 9/2020 | Liu | H04B 7/0617 |

OTHER PUBLICATIONS

International Search Report and Written Opinion—PCT/US2021/070357—ISA/EPO—dated Jul. 5, 2021.
Mediatek Inc, "Discussion on HST Transmission Scheme", 3GPP Draft, 3GPP TSG-RAN WG4 Meeting #93, R4-1913269, 3rd Generation Partnership Project (3GPP), Mobile Competence Centre, 650, Route Des Lucioles, F-06921 Sophia-Antipolis Cedex, France, vol. RAN WG4, No. Reno, USA, Nov. 18, 2019-Nov. 22, 2019, Nov. 8, 2019 (Nov. 8, 2019), XP051817891, 7 Pages, Retrieved from the Internet: URL: https://ftp.3gpp.org/tsg_ran/WG4_Radio/TSGR4_93/Docs/R4-1913269.zip. R4-1913269, Discussion on HST Transmission Scheme.docx [Retrieved on Nov. 8, 2019] Section 2.

* cited by examiner

INDICATION OF SYNCHRONIZATION SIGNAL BLOCK PROPERTIES OF SINGLE FREQUENCY NETWORKS

CROSS-REFERENCE TO RELATED APPLICATION

This Patent Application claims priority to U.S. Provisional Patent Application No. 63/007,050, filed on Apr. 8, 2020, and entitled "INDICATION OF SYNCHRONIZATION SIGNAL BLOCK PROPERTIES OF SINGLE FREQUENCY NETWORKS." The disclosure of the prior Application is considered part of and is incorporated by reference into this Patent Application.

FIELD OF THE DISCLOSURE

Aspects of the present disclosure generally relate to wireless communication and to techniques and apparatuses for indicating synchronization signal block properties of single frequency networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include receiving synchronization signal block (SSB) information that indicates, for each respective SSB of one or more SSBs, a quantity of how many beams are associated with the respective SSB. The method may include monitoring SSBs, determining one or more beams that provide an SSB based at least in part on the SSB information, and directing one or more reception beams toward the one or more beams.

In some aspects, a method of wireless communication, performed by a base station, may include determining SSB information that indicates, for each respective SSB of one or more SSBs, a quantity of how many beams are associated with the respective SSB, and transmitting the SSB information to a UE.

In some aspects, a UE for wireless communication may include a memory and one or more processors operatively coupled to the memory. The memory and the one or more processors may be configured to receive SSB information that indicates, for each respective SSB of one or more SSBs, a quantity of how many beams are associated with the respective SSB. The UE may monitor SSBs, determine one or more beams that provide an SSB based at least in part on the SSB information, and direct one or more reception beams toward the one or more beams.

In some aspects, a base station for wireless communication may include a memory and one or more processors operatively coupled to the memory. The memory and the one or more processors may be configured to determine SSB information that indicates, for each respective SSB of one or more SSBs, a quantity of how many beams are associated with the respective SSB, and transmit the SSB information to a UE.

In some aspects, a non-transitory computer-readable medium may store one or more instructions for wireless communication. The one or more instructions, when executed by one or more processors of a UE, may cause the one or more processors to receive SSB information that indicates, for each respective SSB of one or more SSBs, a quantity of how many beams are associated with the respective SSB, monitor SSBs, determine one or more beams that provide an SSB based at least in part on the SSB information, and direct one or more reception beams toward the one or more beams.

In some aspects, a non-transitory computer-readable medium may store one or more instructions for wireless communication. The one or more instructions, when executed by one or more processors of a base station, may cause the one or more processors to determine SSB information that indicates, for each respective SSB of one or more SSBs, a quantity of how many beams are associated with the respective SSB, and transmit the SSB information to a UE.

In some aspects, an apparatus for wireless communication may include means for receiving SSB information that indicates, for each respective SSB of one or more SSBs, a quantity of how many beams are associated with the respective SSB, means for monitoring SSBs, means for determining one or more beams that provide an SSB based at least in part on the SSB information, and means for directing one or more reception beams toward the one or more beams.

In some aspects, an apparatus for wireless communication may include means for determining SSB information that indicates, for each respective SSB of one or more SSBs, a quantity of how many beams are associated with the respective SSB, and means for transmitting the SSB information to a UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antennas, RF-chains, power amplifiers, modulators, buffers, processor(s), interleavers, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
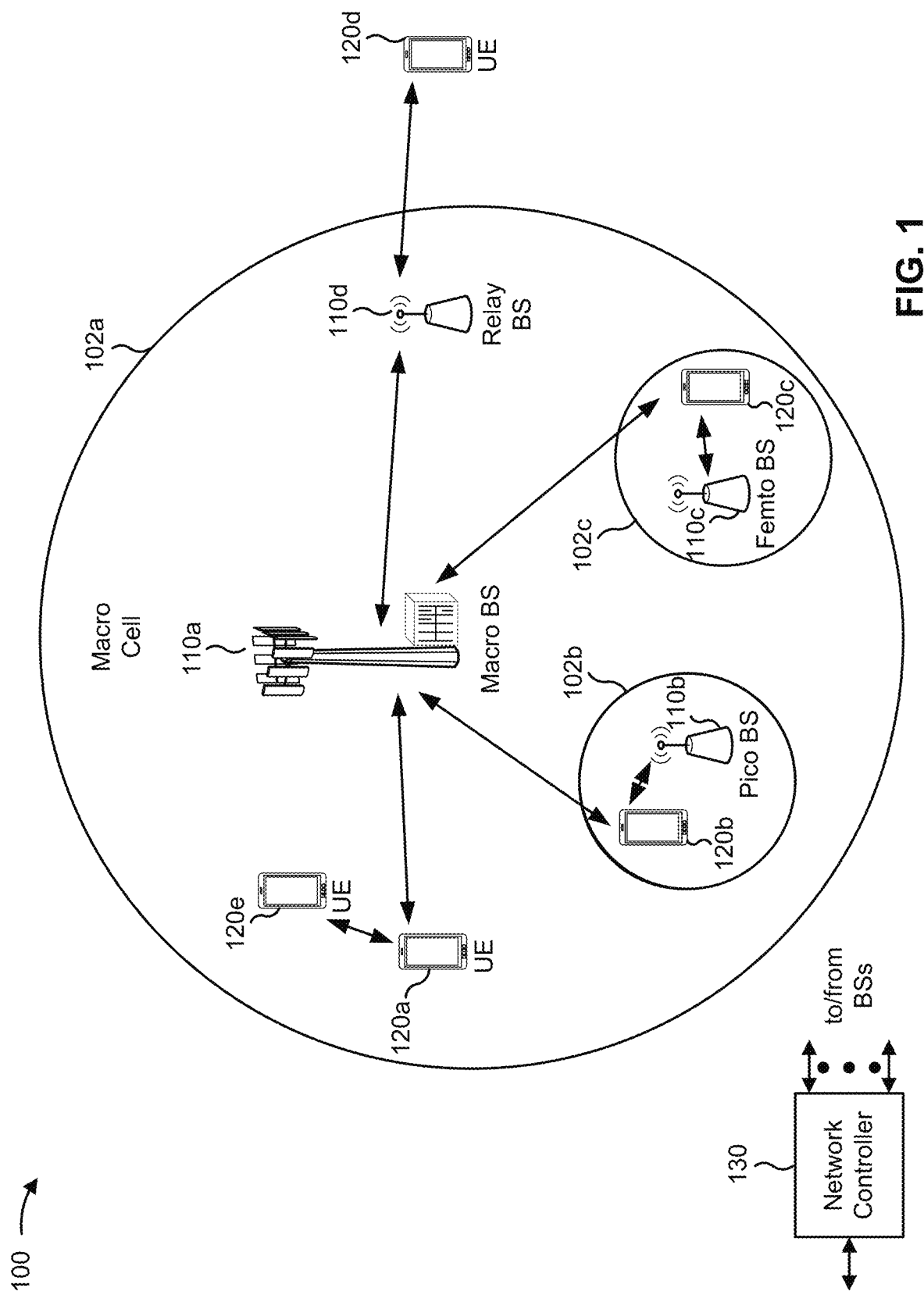
FIG. 1 is a diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
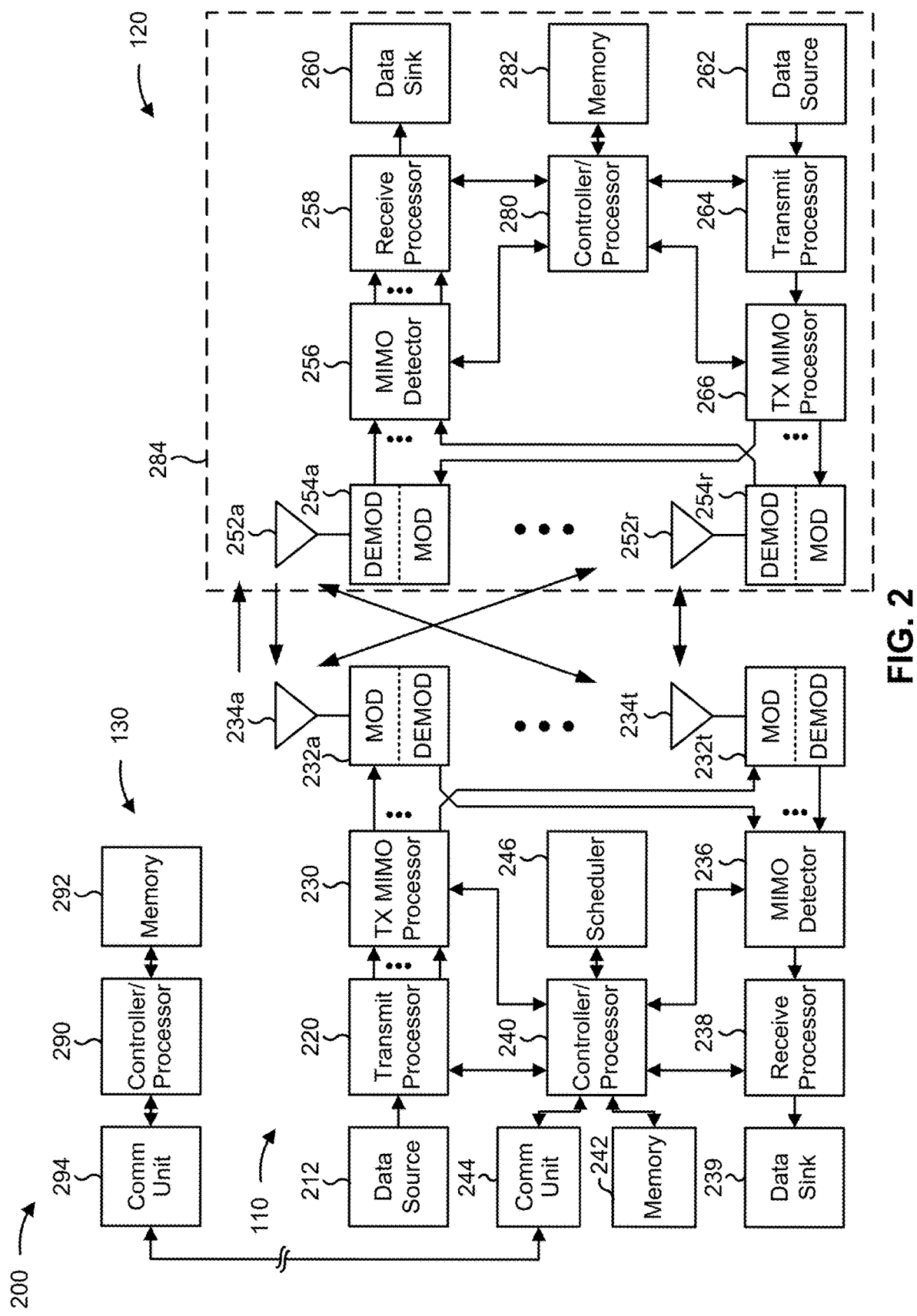
FIG. 2 is a diagram illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-12).

Controller/processor 240 of base station 110, controller/processor 280 of UE 120, and/or any other component(s) of FIG. 2 may perform one or more techniques associated with indicating synchronization signal block (SSB) properties of single frequency networks (SFNs), as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1100 of FIG. 12, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for receiving SSB information that indicates, for each respective SSB of one or more SSBs, a quantity of how many beams are associated with the respective SSB, means for monitoring SSBs, means for determining one or more beams that provide an SSB based at least in part on the SSB information, and/or means for directing one or more reception beams toward the one or more beams.

In some aspects, base station 110 may include means for determining SSB information that indicates, for each respective SSB of one or more SSBs, a quantity of how many beams are associated with the respective SSB, and/or means for transmitting the SSB information to a UE. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

As indicated above, FIG. 2 is provided as an example. Other examples may differ from what is described with regard to FIG. 2.

Figure 3:
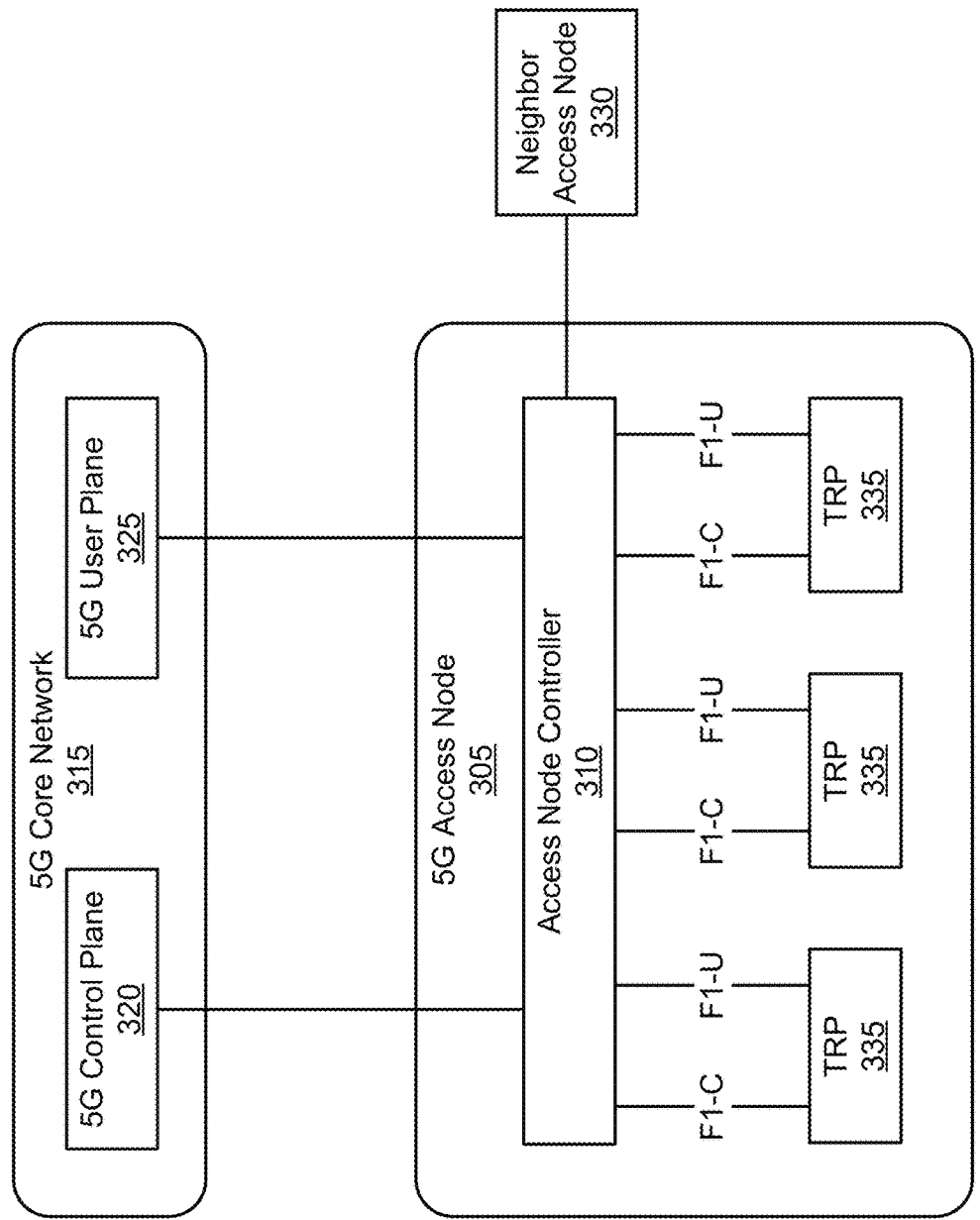
FIG. 3 illustrates an example logical architecture of a distributed radio access network, according to aspects of the present disclosure.

FIG. 3 illustrates an example logical architecture of a distributed radio access network (RAN) 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at access node controller 310.

Access node controller 310 may include and/or may communicate with one or more TRPs 335 (e.g., via an F1 Control (F1-C) interface and/or an F1 User (F1-U) interface). A TRP 335 may be a distributed unit (DU) of distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-co-location (QCL) relationships (e.g., different spatial parameters, different transmission configuration indicator (TCI) states, different precoding parameters, different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
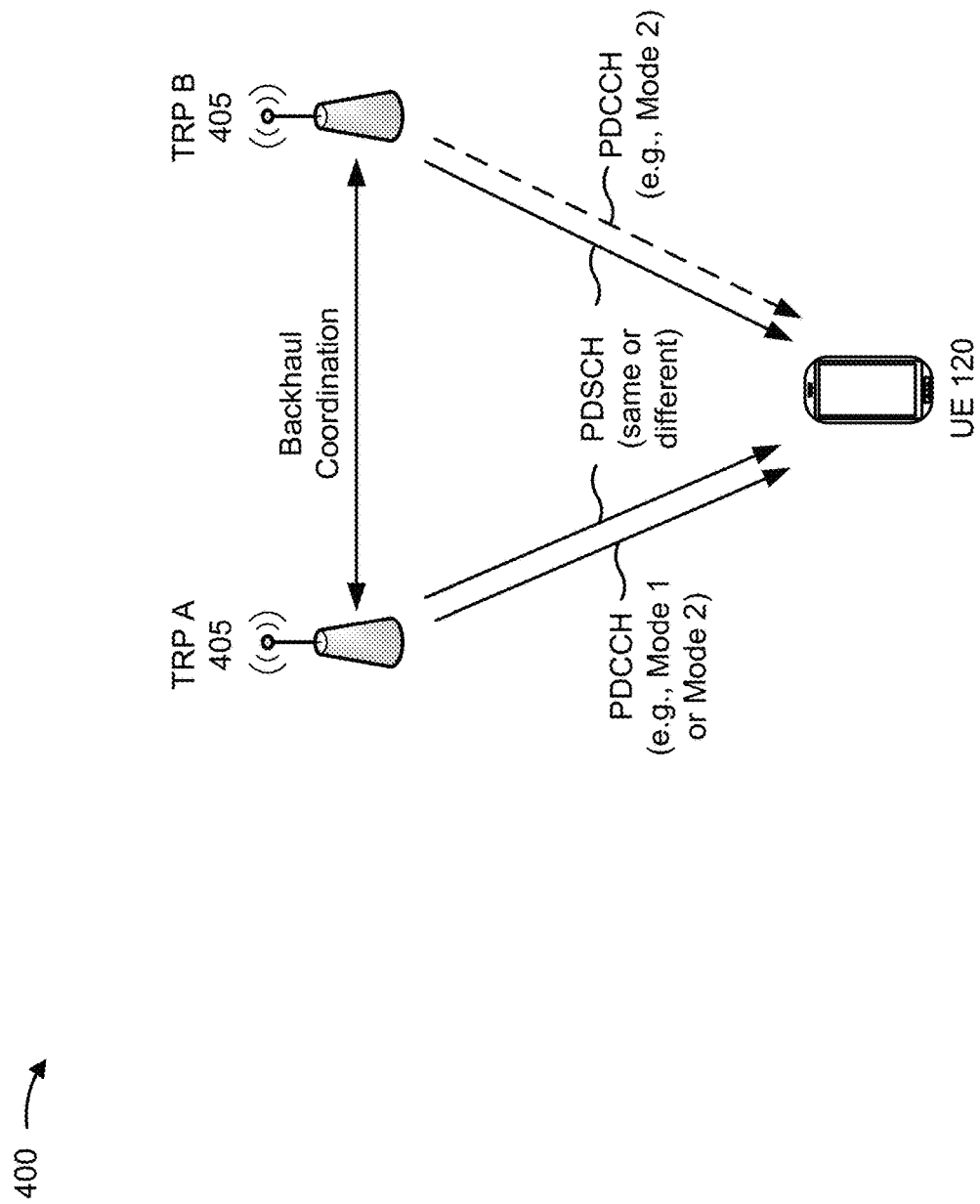
FIG. 4 is a diagram illustrating an example of multiple transmit receive point (TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. TRPs 405 may coordinate such communications via an interface between TRPs 405 (e.g., a backhaul interface, an access node controller 310). The interface may have a smaller delay and/or higher capacity when TRPs 405 are co-located at the same base station 110 (e.g., when TRPs 405 are different antenna arrays or panels of the same base station 110), and may have a larger delay and/or lower capacity (as compared to co-location) when TRPs 405 are located at different base stations 110. The different TRPs 405 may communicate with UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
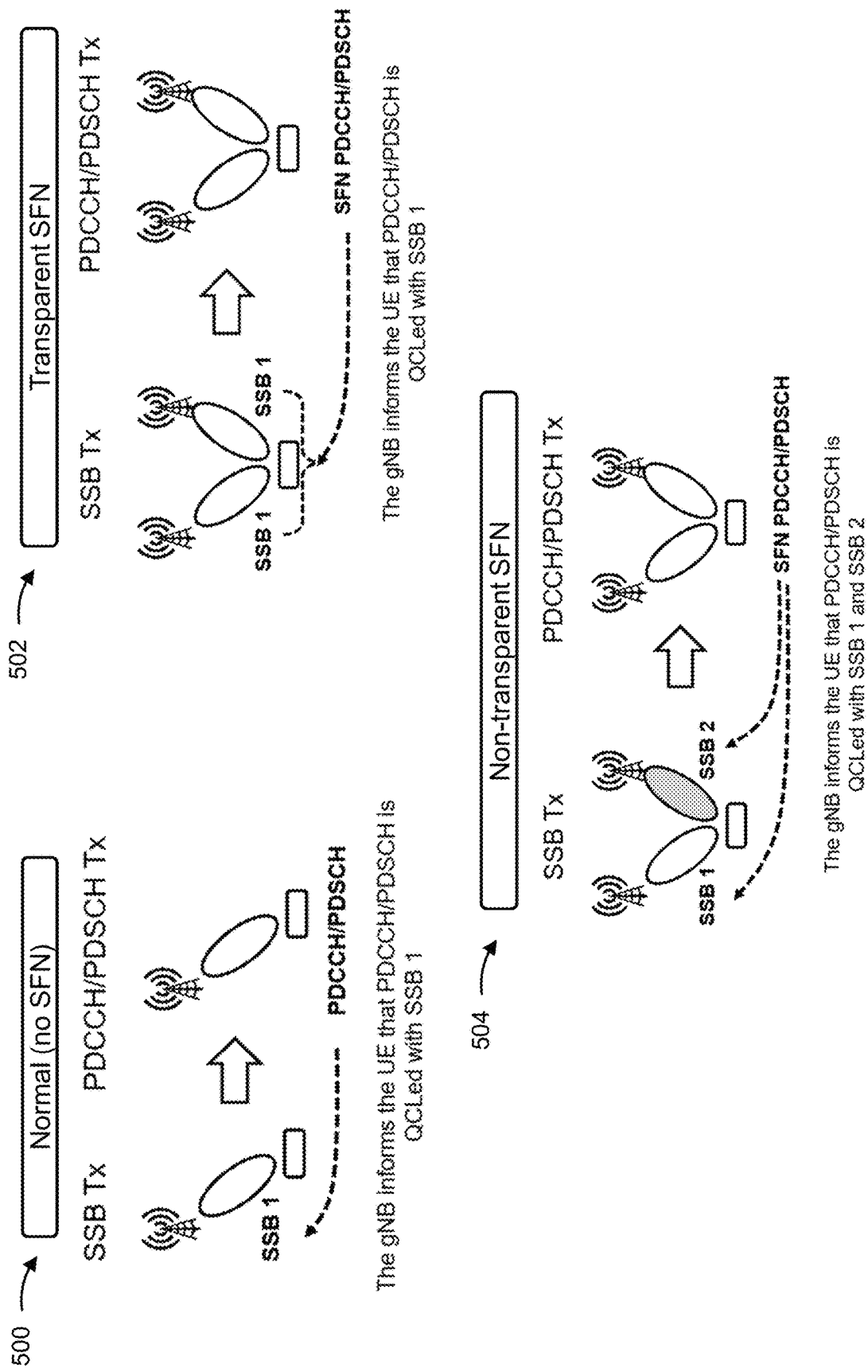
FIG. 5 is a diagram illustrating examples of TRPs transmitting data on the same frequency resources, in accordance with the present disclosure.

FIG. 5 is a diagram illustrating examples 500, 502, and 504 of TRPs transmitting data on the same frequency resources, in accordance with the present disclosure.

FIG. 5 shows an example 500 of a TRP transmitting an SSB on a transmission (Tx) beam to a UE. The UE may be on a high speed train (HST). A base station (e.g., gNB) may indicate to the UE that a PDCCH and a PDSCH are QCLed with the beam that provides the SSB. In other words, the UE on the HST may expect the PDCCH and the PDSCH on the same transmission beam that provides the SSB. The UE may direct a reception beam to the transmission beam from the TRP. This may include aligning a beam configuration (spatial filter) with the transmission beam from the TRP.

In some aspects, multiple TRPs may transmit the same data on the same time and/or frequency resources. For example, the data may be transmitted in an SFN, where a single frequency is used for each of multiple beams from multiple TRPs. As shown in FIG. 5, and by reference number 502, a first TRP and a second TRP may both transmit the same SSB (SSB 1) to the UE on the HST using beams of the same frequency. However, the UE does not know whether SFN is used. For example, the UE does not know whether SSB 1 (and the PDCCH/PDSCH) is provided from one beam or two beams. This scenario may be referred to as transparent SFN.

As shown in FIG. 5, and by reference number 504, the first TRP may transmit a first SSB (SSB 1) and the second TRP may transmit a second SSB (SSB 2) to the UE on the HST. In this scenario, the gNB may indicate that the PDCCH and the PDSCH are QCLed with the first beam that provides SSB 1 and the second beam that provides SSB 2. This scenario may be referred to as non-transparent SFN.

As indicated above, FIG. 5 provides some examples. Other examples may differ from what is described with respect to FIG. 5.

Figure 6:
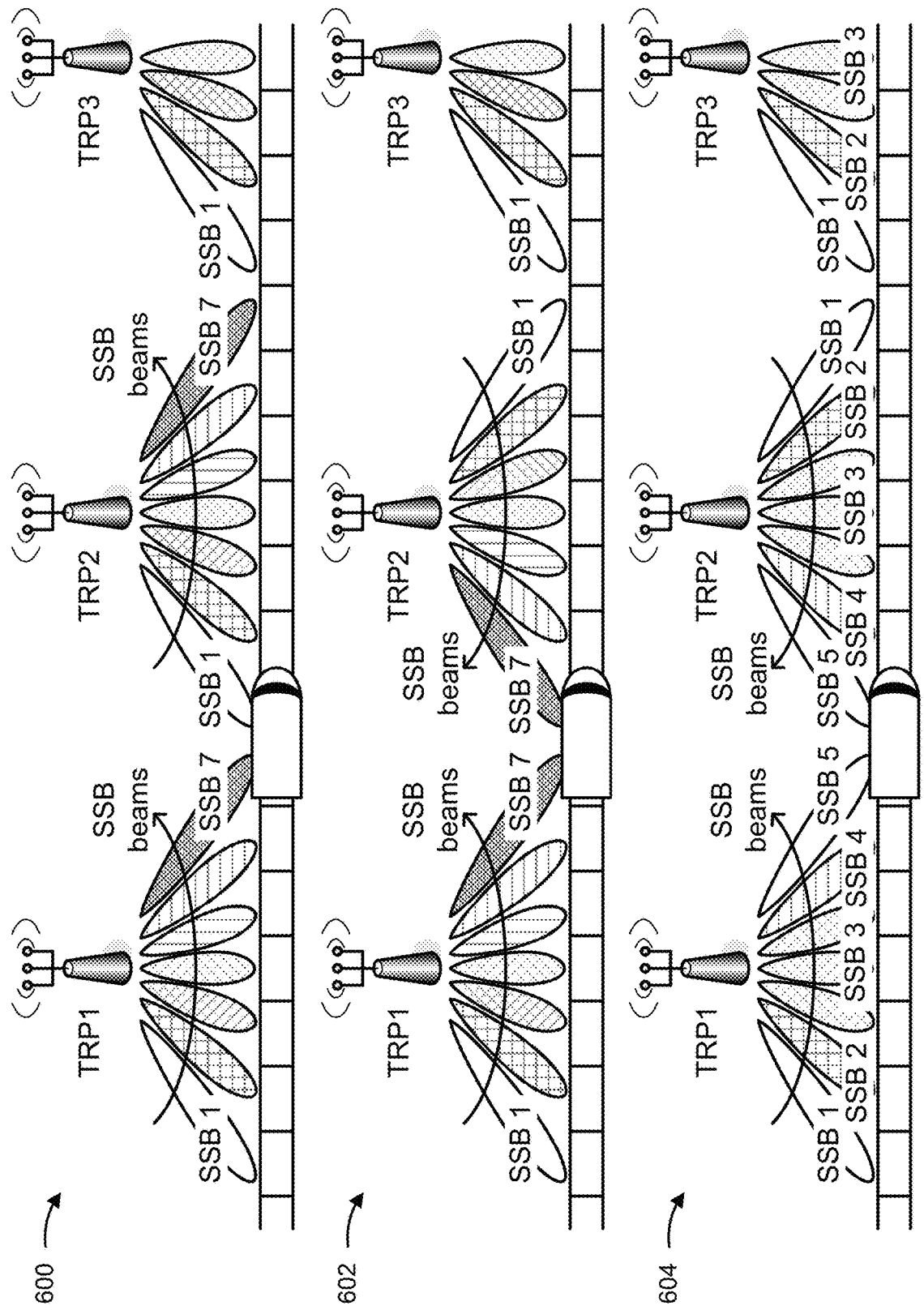
FIG. 6 is a diagram illustrating examples of TRPs transmitting synchronization signal blocks (SSBs) to a UE on a high speed train, in accordance with the present disclosure.

FIG. 6 is a diagram illustrating examples 600, 602, and 604 of TRPs transmitting SSBs to a UE on an HST, in accordance with the present disclosure.

FIG. 6 shows an example 600 of SSB mapping for multiple TRPs along a track for the HST. For example, each TRP may transmit different SSBs (SSB 1 through SSB 7) on beams pointed in different directions. An order of beams for SSBs is the same from one TRP to a next TRP. At a first TRP boundary, TRP1 is transmitting SSB 7 toward the UE and TRP2 is transmitting SSB 1 toward the UE. The SSBs are not the same and thus the pattern in example 600 is not suitable for an SFN, or there is little to gain from using an SFN.

FIG. 6 shows an example 602 of a reverse order SSB mapping for multiple TRPs along the track for the HST. As shown by example 602, a beam order for TRP1 is SSB 1 through SSB 7, a beam order for TRP2 is SSB 7 through SSB 1, and a beam order for TRP3 is SSB 1 through SSB 7. At the first TRP boundary, TRP1 is transmitting SSB 7 toward the UE and TRP2 is also transmitting SSB 7 toward the UE. At a second TRP boundary, TRP2 may transmit SSB 1 toward the UE and TRP3 may also transmit SSB 1 toward the UE. Because the UE may receive the same SSB from two beams, SFN may be used for TRP boundaries.

FIG. 6 shows an example 604 of a reverse order SSB mapping with multiple beams in a central region that are the same. As shown by example 604, the beam order for TRP1 and the beam order for TRP2 is the same, but there are multiple beams in the central region of each TRP that transmit the same SSB (SSB 3). This may increase the opportunity for the UE to receive an SSB from multiple beams.

As indicated above, FIG. 6 provides some examples. Other examples may differ from what is described with respect to FIG. 6.

Figure 7:
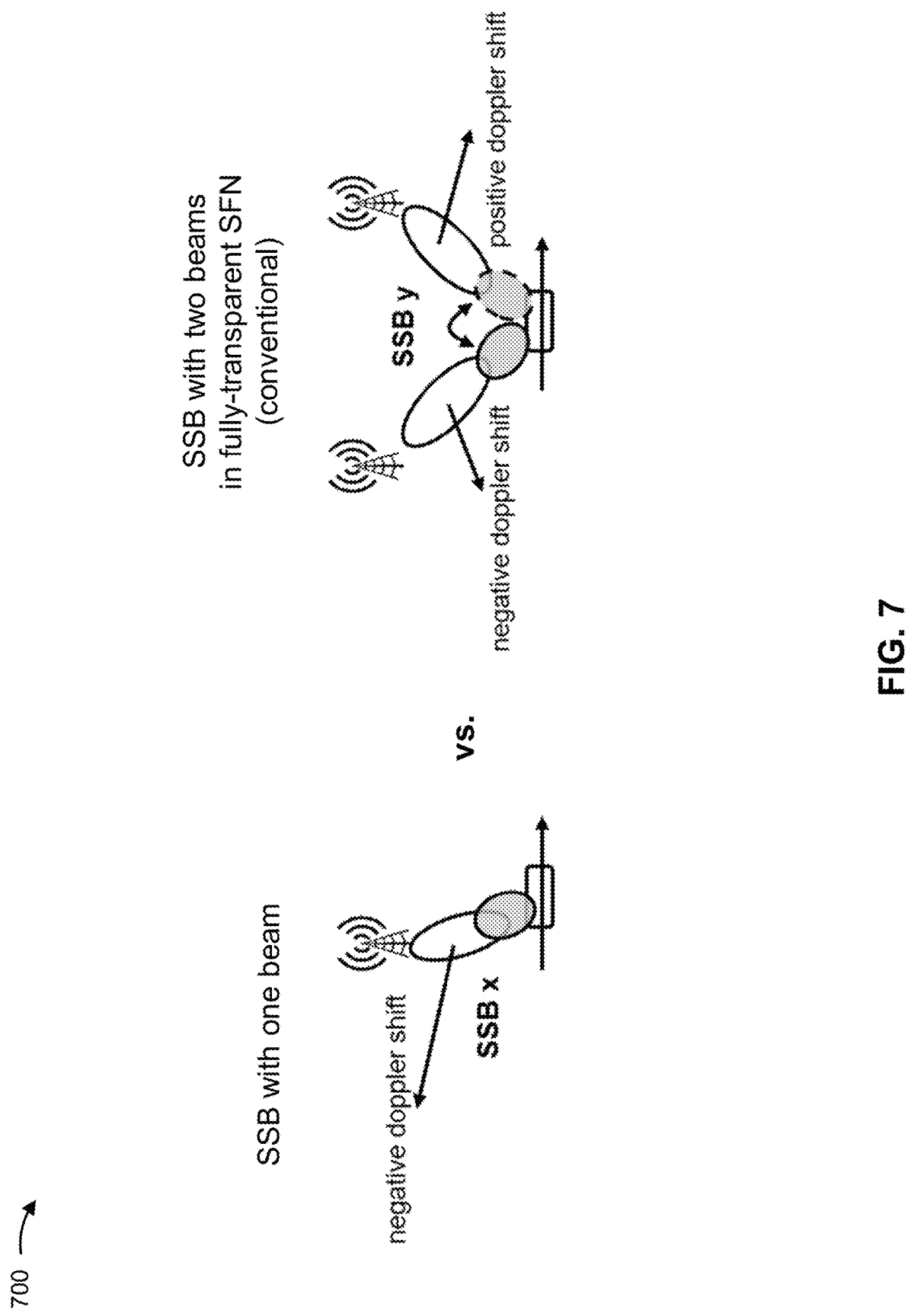
FIG. 7 is a diagram illustrating an example of beams that are not single frequency network (SFN) transparent to a UE, in accordance with the present disclosure.

FIG. 7 is a diagram illustrating an example 700 of beams that are SFN transparent to a UE, in accordance with the present disclosure.

FIG. 7 shows an SSB transmitted on one beam from one TRP as compared to an SSB transmitted on two SFN beams from two TRPs. While the SSB may be transmitted on two SFN beams, if the SFN is fully transparent (not known) to the UE, the UE may not be able to differentiate whether the SSB is received on one beam or multiple SFN beams. In other words, the UE may not take advantage of any benefit that is available from receiving the SSB on multiple beams.

For example, in a typical operation (shown on the left side of FIG. 7), the UE may determine a reception beam associated with a transmission beam of the SSB from one TRP. The UE may estimate a channel and/or determine a Doppler shift (negative or positive) using the transmission beam from the one TRP. In an operation with two TRPs (shown on the right side of FIG. 7), each TRP may transmit the SSB on a transmission beam. However, if the UE does not know that the SSB is associated with two transmission beams, the UE may follow the typical operation. That is, the UE may direct a reception beam towards one of the transmission beams, and that transmission beam may not be the better of the two transmission beams. The UE may therefore miss an opportunity to improve communications to and from TRPs. This missed opportunity may be more pronounced for a UE on an HST. By not taking advantage of opportunities for improved communications, the UE may waste power, processing resources, and signaling resources.

As indicated above, FIG. 7 is provided as an example. Other examples may differ from what is described with respect to FIG. 7.

Figure 8:
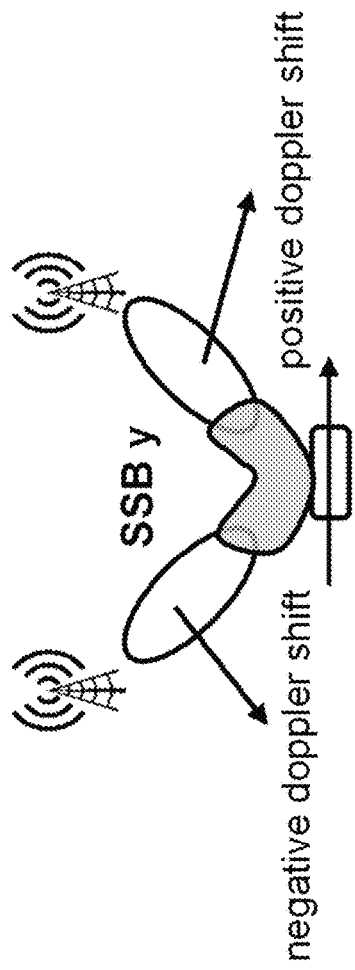
FIG. 8 is a diagram illustrating an example of indicating SSB properties of SFNs, in accordance with the present disclosure.

FIG. 8 is a diagram illustrating an example 800 of indicating SSB properties of SFNs, in accordance with the present disclosure.

FIG. 8 shows two transmission beams from two TRPs in a semi-transparent SFN. In some aspects, a gNB may provide SSB information to the UE, indicating that a particular SSB may be received from one beam, two beams, three beams, or more. The SSB information may also indicate, for multiple beams, whether the multiple beams are from the same TRP or different TRPs. In this way, the UE may determine, from the SSB information, whether an SSB is received from multiple transmission beams. As a result, the UE may, for example, direct a reception beam to a stronger beam of the two transmission beams, or direct two reception beams to the two transmission beams. The UE may estimate a channel and/or determine a Doppler shift from each beam and improve decoding performance using parameters estimated separately from the two beams. As a result, the SSB and a QCLed PDCCH and/or PDSCH may be received with more gain and less degradation. Better communications, more gain, and less degradation cause the UE to conserve power, processing resources, and signaling resources.

As indicated above, FIG. 8 is provided as an example. Other examples may differ from what is described with respect to FIG. 8.

Figure 9:
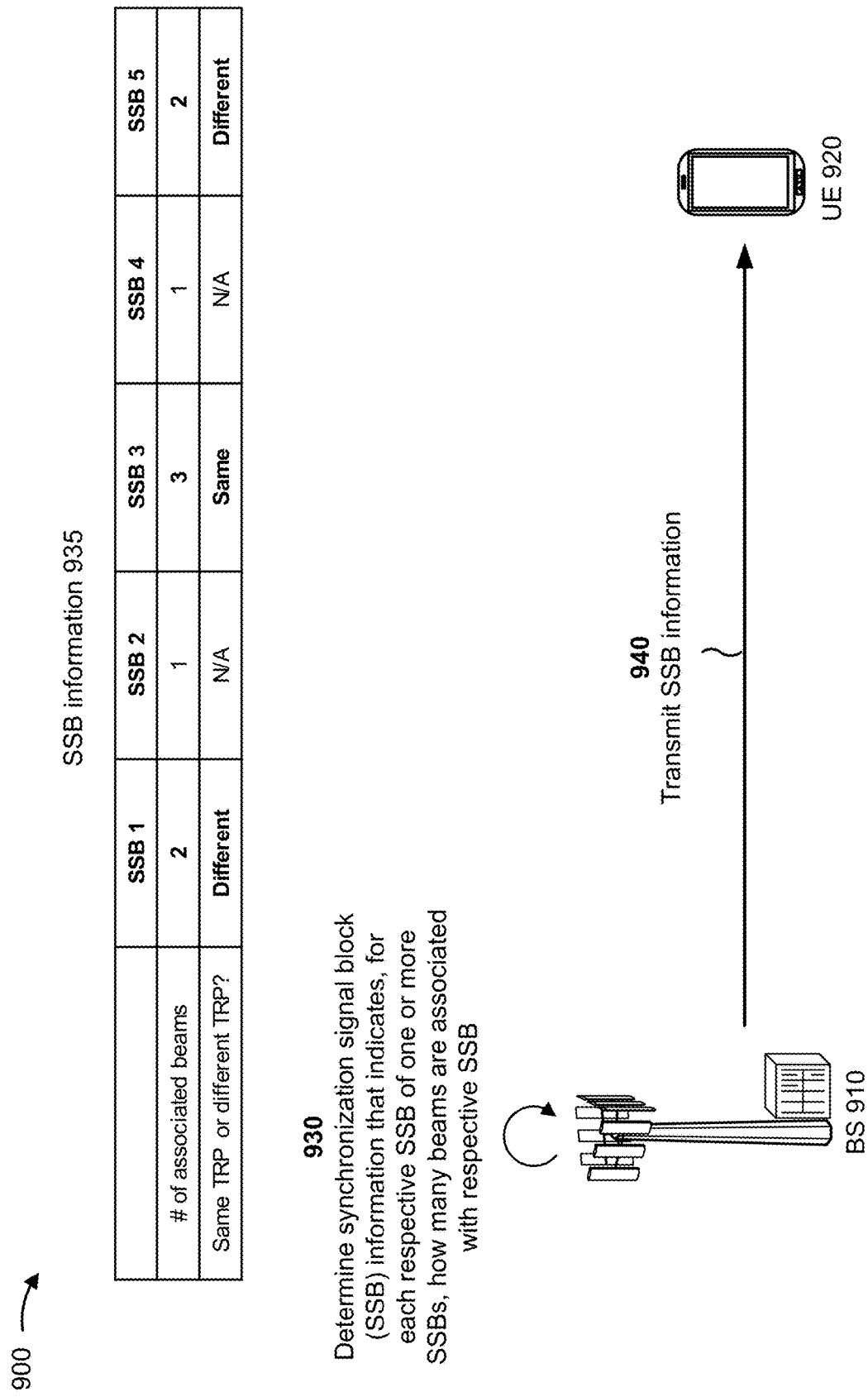
FIG. 9 is a diagram illustrating an example of indicating SSB properties of SFNs, in accordance with the present disclosure.

FIG. 9 is a diagram illustrating an example 900 of indicating SSB properties of SFNs, in accordance with the present disclosure. FIG. 9 shows a base station (BS) 910 (e.g., a BS 110 depicted in FIGS. 1 and 2, and/or the like) and a UE 920 (a UE 120 depicted in FIGS. 1 and 2, and/or the like) that may communicate with each other. UE 920 may be on an HST passing multiple TRPs. The TRPs may each transmit one or more beams. One or more of the beams may be SFN beams.

As shown by reference number 930, BS 910 may determine SSB information that indicates, for each SSB of one or more SSBs, how may beams are associated with the respective SSB. FIG. 9 shows example SSB information 935 that may correspond to SSB beam orders shown in example 604 of FIG. 6. SSB information 935 shows SSB information for multiple SSBs (SSB 1 through SSB 5). For example, SSB 1 is associated with two beams that are from different TRPs. SSB 2 is associated with one beam. SSB 3 is associated with three beams from the same TRP. SSB 4 is associated with one beam. SSB 5 is associated with two beams from different TRPs.

As shown by reference number 940, BS 910 may transmit the SSB information to UE 920. In some aspects, BS 910 may transmit the SSB information via system information or radio resource control (RRC) messages. The SSB information may include one or more bits that indicate a quantity of beams for each SSB. For example, one bit may indicate whether there is one beam or multiple beams for an SSB. In some aspects, multiple bits may be used to indicate how many beams are associated with an SSB. In some aspects, the SSB information may indicate wide beams, narrow beams, or a combination thereof.

As indicated above, FIG. 9 is provided as an example. Other examples may differ from what is described with respect to FIG. 9.

Figure 10:
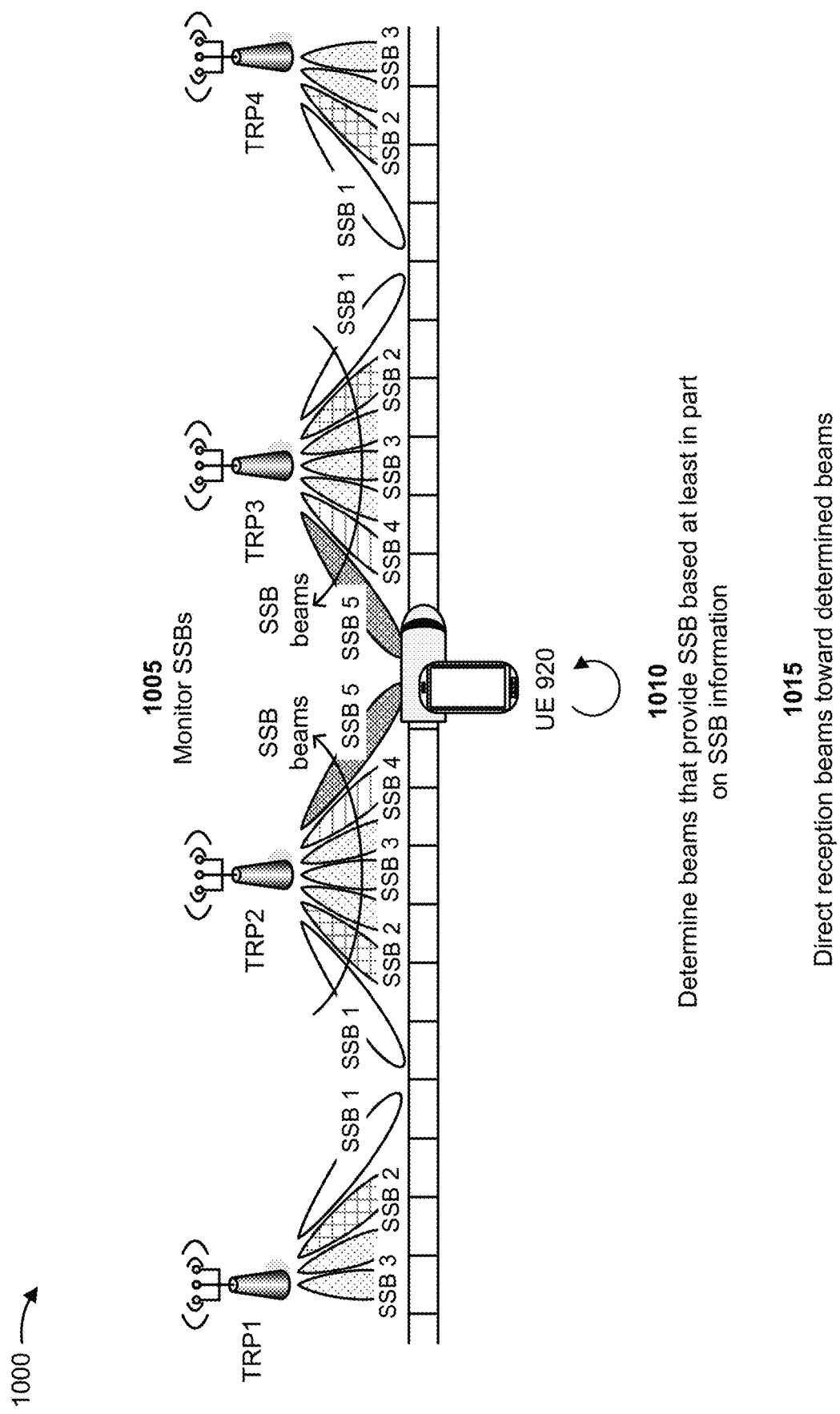
FIG. 10 is a diagram illustrating an example of indicating SSB properties of SFNs, in accordance with the present disclosure.

FIG. 10 is a diagram illustrating an example 1000 of indicating SSB properties of SFNs, in accordance with the present disclosure. FIG. 10 shows UE 920 on an HST passing multiple TRPs that follow SSB beam orders similar to the beam orders shown in example 604 of FIG. 6. UE 920 has received SSB information from BS 910, as described in connection with FIG. 9.

As shown by reference number 1005, UE 920 may monitor SSBs. While monitoring SSBs, UE 920 may receive one or more SSBs, such as SSB 1 through SSB 5. Each SSB that UE 920 receives may be from one beam or multiple beams. The multiple beams may be from multiple TRPs. As shown by reference number 1010, UE 920 may determine one or more beams that provide a particular SSB, based at least in part on the SSB information received from BS 910. For example, as shown in FIG. 10, the HST is at a boundary of TRP2 and TRP3. UE 920 on the HST may receive SSB 5. UE 920 may determine, from SSB information (e.g., SSB information 935 in FIG. 9), that SSB 5 is associated with two beams from different TRPs. UE 920 may thus determine that there are two transmission beams providing SSB 5, one beam from TRP2 and one beam from TRP3.

In some aspects, UE 920 may estimate a channel and/or determine a Doppler shift for each beam. UE 920 may determine which beam has more gain, a more accurate channel estimation, and/or less Doppler shift. As shown by reference number 1015, UE 920 may direct a reception beam toward such a beam. In some aspects, UE 920 may direct one reception beam toward one of the transmission beams and direct another reception beam toward the other transmission beam. As a result, UE 920 may experience improved communications over a corresponding PDCCH and/or PDSCH. UE 920 may also experience improved communications over a physical uplink channel and/or improved reference signals.

As indicated above, FIG. 10 is provided as an example. Other examples may differ from what is described with respect to FIG. 10.

Figure 11:
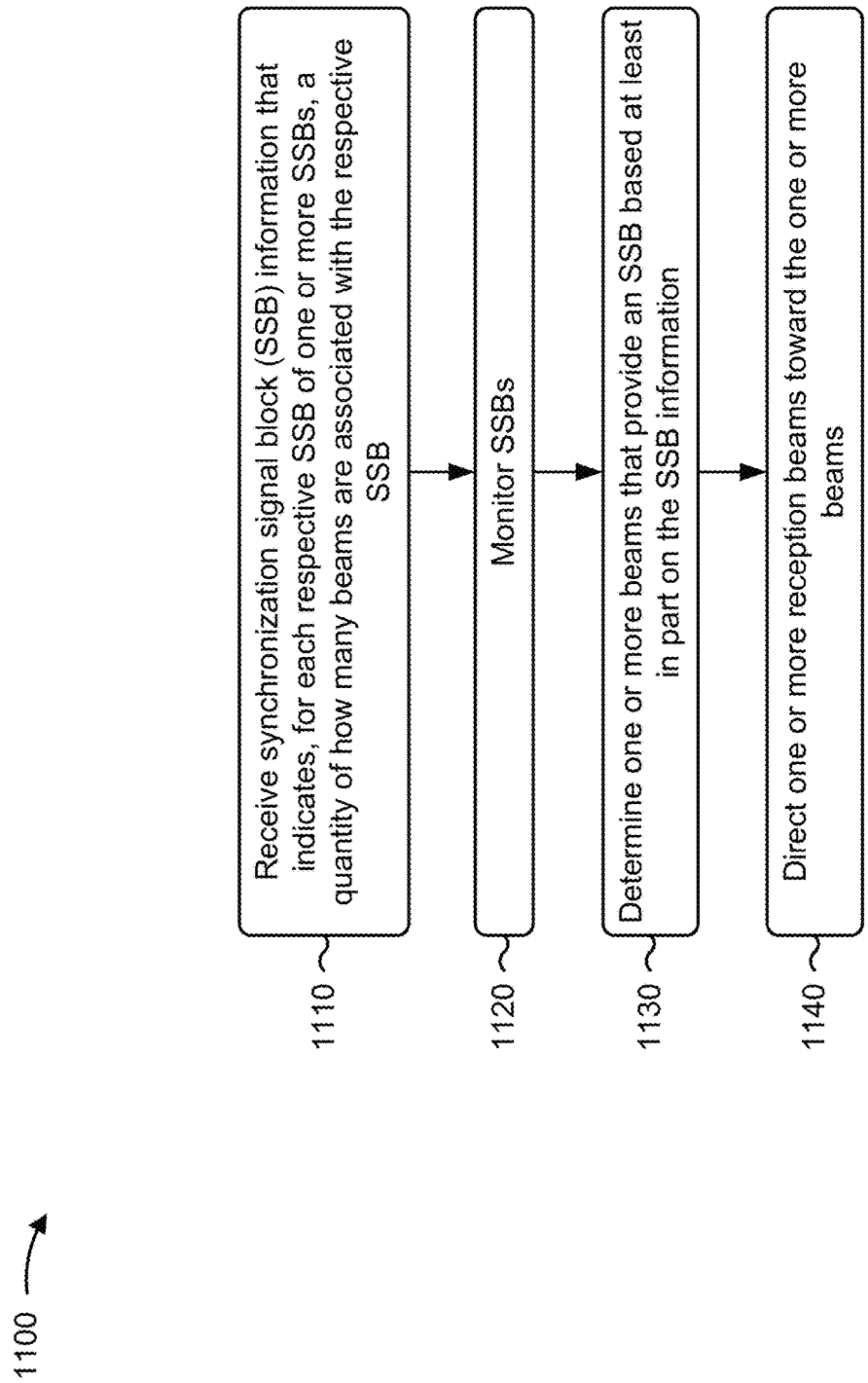
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120 depicted in FIGS. 1 and 2, UE 920 depicted in FIGS. 9 and 10) performs operations associated with indicating SSB properties of SFNs.

As shown in FIG. 11, in some aspects, process 1100 may include receiving SSB information that indicates, for each respective SSB of one or more SSBs, a quantity of how many beams are associated with the respective SSB (block 1110). For example, the UE (e.g., using receive processor 258, transmit processor 264, controller/processor 280, memory 282) may receive SSB information that indicates, for each respective SSB of one or more SSBs, a quantity of how many beams are associated with the respective SSB, as described above.

As further shown in FIG. 11, in some aspects, process 1100 may include monitoring SSBs (block 1120). For example, the UE (e.g., using receive processor 258, transmit processor 264, controller/processor 280, memory 282) may monitor SSBs, as described above.

As further shown in FIG. 11, in some aspects, process 1100 may include determining one or more beams that provide an SSB based at least in part on the SSB information (block 1130). For example, the UE (e.g., using receive processor 258, transmit processor 264, controller/processor 280, memory 282) may determine one or more beams that provide an SSB based at least in part on the SSB information, as described above.

As further shown in FIG. 11, in some aspects, process 1100 may include directing one or more reception beams toward the one or more beams (block 1140). For example, the UE (e.g., using receive processor 258, transmit processor 264, controller/processor 280, memory 282) may direct one or more reception beams toward the one or more beams, as described above.

Process 1100 may include additional aspects, such as any single aspect or any combination of aspects described below and/or in connection with one or more other processes described elsewhere herein.

In a first aspect, the quantity indicates two or more beams and the SSB information indicates whether the two or more beams are from a same TRP or different TRPs, and determining the one or more beams includes determining two or more beams based at least in part on whether the two or more beams are from the same TRP or different TRPs.

In a second aspect, alone or in combination with the first aspect, the SSB information indicates a first beam for the SSB and a second beam for the SSB that are from different TRPs, and directing the one or more reception beams toward the one or more beams includes directing a first reception beam toward the first beam and directing a second reception beam toward the second beam.

In a third aspect, alone or in combination with one or more of the first and second aspects, process 1100 includes determining one or more of a channel estimation or a Doppler shift for each of the two or more beams.

In a fourth aspect, alone or in combination with one or more of the first through third aspects, the quantity is indicated by one or more bits.

In a fifth aspect, alone or in combination with one or more of the first through fourth aspects, the SSB information indicates whether each beam corresponding to a respective SSB is a wide beam or a narrow beam.

In a sixth aspect, alone or in combination with one or more of the first through fifth aspects, the one or more beams include one or more SFN beams.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., BS 110 depicted in FIGS. 1 and 2, BS 910 depicted in FIG. 9) performs operations associated with indicating SSB properties of SFNs.

As shown in FIG. 12, in some aspects, process 1200 may include determining SSB information that indicates, for each respective SSB of one or more SSBs, a quantity of how many beams are associated with the respective SSB (block 1210). For example, the base station (e.g., using transmit processor 220, receive processor 238, controller/processor 240, memory 242) may determine SSB information that indicates, for each respective SSB of one or more SSBs, a quantity of how many beams are associated with the respective SSB, as described above.

As further shown in FIG. 12, in some aspects, process 1200 may include transmitting the SSB information to a UE (block 1220). For example, the base station (e.g., using transmit processor 220, receive processor 238, controller/processor 240, memory 242) may transmit the SSB information to a UE, as described above.

Process 1200 may include additional aspects, such as any single aspect or any combination of aspects described below and/or in connection with one or more other processes described elsewhere herein.

In a first aspect, transmitting the SSB information includes transmitting the SSB information via one or more of system information or a radio resource control message.

In a second aspect, alone or in combination with the first aspect, the quantity indicates two or more beams and the SSB information indicates whether the two or more beams are from a same TRP or different TRPs.

In a third aspect, alone or in combination with one or more of the first and second aspects, the quantity is indicated by one or more bits.

In a fourth aspect, alone or in combination with one or more of the first through third aspects, the SSB information indicates whether each beam corresponding to a respective SSB is a wide beam or a narrow beam. The beams may include one or more SFN beams.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving synchronization signal block (SSB) information that indicates, for each respective SSB of one or more SSBs, a quantity of how many beams are associated with the respective SSB; monitoring SSBs; determining one or more beams that provide an SSB based at least in part on the SSB information; and directing one or more reception beams toward the one or more beams.

Aspect 2: The method of Aspect 1, wherein the quantity indicates two or more beams and the SSB information indicates whether the two or more beams are from a same transmit receive point (TRP) or different TRPs, and wherein determining the one or more beams includes determining two or more beams based at least in part on whether the two or more beams are from the same TRP or different TRPs.

Aspect 3: The method of Aspect 2, wherein the SSB information indicates a first beam for the SSB and a second beam for the SSB that are from different TRPs, and wherein directing the one or more reception beams toward the one or more beams includes directing a first reception beam toward the first beam and directing a second reception beam toward the second beam.

Aspect 4: The method of Aspect 2, further comprising determining one or more of a channel estimation or a Doppler shift for each of the two or more beams.

Aspect 5: The method of any of Aspects 1-4, wherein the quantity is indicated by one or more bits.

Aspect 6: The method of any of Aspects 1-5, wherein the SSB information indicates whether each beam corresponding to a respective SSB is a wide beam or a narrow beam.

Aspect 7: The method of any of Aspects 1-6, wherein the one or more beams include one or more single frequency network (SFN) beams.

Aspect 8: A method of wireless communication performed by a base station, comprising: determining synchronization signal block (SSB) information that indicates, for each respective SSB of one or more SSBs, a quantity of how many beams are associated with the respective SSB; and transmitting the SSB information to a user equipment (UE).

Aspect 9: The method of Aspect 8, wherein transmitting the SSB information includes transmitting the SSB information via one or more of system information or a radio resource control message.

Aspect 10: The method of Aspect 8 or 9, wherein the quantity indicates two or more beams, and the SSB information indicates whether the two or more beams are from a same transmit receive point (TRP) or different TRPs.

Aspect 11: The method of any of Aspects 8-10, wherein the quantity is indicated by one or more bits.

Aspect 12: The method of any of Aspects 8-11, wherein the SSB information indicates whether each beam corresponding to a respective SSB is a wide beam or a narrow beam.

Aspect 13: An apparatus for wireless communication at a device, comprising a processor; memory coupled with the processor; and instructions stored in the memory and executable by the processor to cause the apparatus to perform the method of one or more Aspects of Aspects 1-12.

Aspect 14: A device for wireless communication, comprising a memory and one or more processors coupled to the memory, the memory and the one or more processors configured to perform the method of one or more Aspects of Aspects 1-12.

Aspect 15: An apparatus for wireless communication, comprising at least one means for performing the method of one or more Aspects of Aspects 1-12.

Aspect 16: A non-transitory computer-readable medium storing code for wireless communication, the code comprising instructions executable by a processor to perform the method of one or more Aspects of Aspects 1-12.

Aspect 17: A non-transitory computer-readable medium storing a set of instructions for wireless communication, the set of instructions comprising one or more instructions that, when executed by one or more processors of a device, cause the device to perform the method of one or more Aspects of Aspects 1-12.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive synchronization signal block (SSB) information that indicates, for each respective SSB of one or more SSBs, a quantity of how many beams are associated with the respective SSB, wherein the quantity is indicated by one or more bits;
   determine one or more beams that provide an SSB based at least in part on the SSB information; and
   direct one or more reception beams toward the one or more beams.

2. The UE of claim 1, wherein the quantity indicates two or more beams and the SSB information indicates whether the two or more beams are from a same transmit receive point (TRP) or different TRPs, and wherein the one or more processors are configured to determine two or more beams based at least in part on whether the two or more beams are from the same TRP or different TRPs.

3. The UE of claim 2, wherein the SSB information indicates a first beam for the SSB and a second beam for the SSB that are from different TRPs, and wherein the one or more processors are configured to direct a first reception beam toward the first beam and directing a second reception beam toward the second beam.

4. The UE of claim 2, wherein the one or more processors are further configured to determine one or more of a channel estimation or a Doppler shift for each of the two or more beams.

5. The UE of claim 1, wherein the SSB information indicates whether each beam corresponding to a respective SSB is a wide beam or a narrow beam.

6. The UE of claim 1, wherein the one or more beams include one or more single frequency network (SFN) beams.

7. The UE of claim 1, wherein a bit of the one or more bits indicates that there is one beam associated with the respective SSB.

8. The UE of claim 1, wherein a bit of the one or more bits indicates that there are multiple beams associated with the respective SSB.

9. A base station for wireless communication, comprising:
   a memory; and
   one or more processors, coupled to the memory, configured to:
   determine synchronization signal block (SSB) information that indicates, for each respective SSB of one or more SSBs, a quantity of how many beams are associated with the respective SSB, wherein the quantity is indicated by one or more bits; and
   transmit the SSB information to a user equipment (UE).

10. The base station of claim 9, wherein the one or more processors are configured to transmit the SSB information via one or more of system information or a radio resource control message.

11. The base station of claim 9, wherein the quantity indicates two or more beams, and the SSB information indicates whether the two or more beams are from a same transmit receive point (TRP) or different TRPs.

12. The base station of claim 9, wherein the SSB information indicates whether each beam corresponding to a respective SSB is a wide beam or a narrow beam.

13. The base station of claim 9, wherein a bit of the one or more bits indicates that there is one beam associated with the respective SSB.

14. The base station of claim 9, wherein a bit of the one or more bits indicates that there are multiple beams associated with the respective SSB.

15. A method of wireless communication performed by a user equipment (UE), comprising:
   receiving synchronization signal block (SSB) information that indicates, for each respective SSB of one or more SSBs, a quantity of how many beams are associated with the respective SSB, wherein the quantity is indicated by one or more bits;
   determining one or more beams that provide an SSB based at least in part on the SSB information; and
   directing one or more reception beams toward the one or more beams.

16. The method of claim 15, wherein the quantity indicates two or more beams and the SSB information indicates whether the two or more beams are from a same transmit receive point (TRP) or different TRPs, and wherein determining the one or more beams includes determining two or more beams based at least in part on whether the two or more beams are from the same TRP or different TRPs.

17. The method of claim 16, wherein the SSB information indicates a first beam for the SSB and a second beam for the SSB that are from different TRPs, and wherein directing the one or more reception beams toward the one or more beams includes directing a first reception beam toward the first beam and directing a second reception beam toward the second beam.

18. The method of claim 16, further comprising determining one or more of a channel estimation or a Doppler shift for each of the two or more beams.

19. The method of claim 15, wherein the SSB information indicates whether each beam corresponding to a respective SSB is a wide beam or a narrow beam.

20. The method of claim 15, wherein the one or more beams include one or more single frequency network (SFN) beams.

21. The method of claim 15, wherein a bit of the one or more bits indicates that there is one beam associated with the respective SSB.

22. The method of claim 15, wherein a bit of the one or more bits indicates that there are multiple beams associated with the respective SSB.

23. A method of wireless communication performed by a base station, comprising:
   determining synchronization signal block (SSB) information that indicates, for each respective SSB of one or more SSBs, a quantity of how many beams are associated with the respective SSB, wherein the quantity is indicated by one or more bits; and
   transmitting the SSB information to a user equipment (UE).

24. The method of claim 23, wherein transmitting the SSB information includes transmitting the SSB information via one or more of system information or a radio resource control message.

25. The method of claim 23, wherein the quantity indicates two or more beams, and the SSB information indicates whether the two or more beams are from a same transmit receive point (TRP) or different TRPs.

26. The method of claim 23, wherein the SSB information indicates whether each beam corresponding to a respective SSB is a wide beam or a narrow beam.

27. The method of claim 23, wherein a bit of the one or more bits indicates that there is one beam associated with the respective SSB.

28. The method of claim 23, wherein a bit of the one or more bits indicates that there are multiple beams associated with the respective SSB.

\* \* \* \* \*